(12) United States Patent
Smith et al.

(10) Patent No.: US 10,683,110 B2
(45) Date of Patent: *Jun. 16, 2020

(54) APPARATUS AND METHOD OF PACKAGING LOOSE PRODUCT

(71) Applicant: Altria Client Services LLC, Richmond, VA (US)

(72) Inventors: Barry S. Smith, Hopewell, VA (US); Steven R. Rinehart, Chesterfield, VA (US); Danielle R. Crawford, Chester, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,334

(22) Filed: Dec. 18, 2017

(65) Prior Publication Data
US 2018/0105295 A1 Apr. 19, 2018

Related U.S. Application Data

(63) Continuation of application No. 13/666,485, filed on Nov. 1, 2012, now Pat. No. 9,845,169.
(Continued)

(51) Int. Cl.
*B65B 5/06* (2006.01)
*B65B 29/00* (2006.01)
(Continued)

(52) U.S. Cl.
CPC ............... *B65B 5/061* (2013.01); *B65B 1/00* (2013.01); *B65B 1/02* (2013.01); *B65B 1/16* (2013.01);
(Continued)

(58) Field of Classification Search
CPC ....... B65B 39/14; B65B 39/145; B65B 39/04; B65B 5/061; B65B 35/20; B65B 35/205;
(Continued)

(56) References Cited

U.S. PATENT DOCUMENTS 3,160,443 A * 12/1964 Harris ................... B65G 51/03
406/85
3,221,190 A 10/1965 Vogt
(Continued)

FOREIGN PATENT DOCUMENTS

| JP | H061304 A | 1/1994 |
| JP | 06-310713 | 11/1994 |

(Continued)

OTHER PUBLICATIONS

International Search Report and Written Opinion dated Jan. 31, 2013 for PCT/US12/63032.
(Continued)

*Primary Examiner* — Robert F Long
*Assistant Examiner* — Eduardo R Ferrero
(74) *Attorney, Agent, or Firm* — Harness, Dickey & Pierce, P.L.C.

(57) ABSTRACT

A method of filling packaging with pouches of product comprises conveying a plurality of spaced apart chutes along a first feed path. Each chute is loaded with pouches of product at a chute loading station. Erect boxes are conveyed along a second feed path to a chute unloading station wherein the second feed path is substantially parallel to the first feed path at the chute unloading station. The pouches of product are transferred from the chutes into interior spaces of the erect boxes at the chute unloading station as the chutes move along the first feed path and the erect boxes move along the second feed path. The chutes are returned to the chute loading station to be filled with pouches of product.

16 Claims, 10 Drawing Sheets

Related U.S. Application Data

(60) Provisional application No. 61/554,303, filed on Nov. 1, 2011.

(51) Int. Cl.

| | | |
|---|---|---|
| *B65B 1/00* | (2006.01) | |
| *B65B 1/02* | (2006.01) | |
| *B65B 35/20* | (2006.01) | |
| *B65B 1/16* | (2006.01) | |
| *B65B 1/36* | (2006.01) | |
| *B65B 43/26* | (2006.01) | |
| *B65B 39/14* | (2006.01) | |
| *B65B 7/20* | (2006.01) | |
| *B65B 39/04* | (2006.01) | |
| *B65B 5/04* | (2006.01) | |
| *B65B 35/40* | (2006.01) | |
| *B65G 51/00* | (2006.01) | |

(52) U.S. Cl.
CPC ............... *B65B 1/363* (2013.01); *B65B 7/20* (2013.01); *B65B 29/00* (2013.01); *B65B 35/205* (2013.01); *B65B 39/14* (2013.01); *B65B 43/265* (2013.01); *B65B 5/04* (2013.01); *B65B 35/20* (2013.01); *B65B 35/405* (2013.01); *B65B 39/04* (2013.01); *B65B 2210/10* (2013.01); *B65B 2220/18* (2013.01); *B65G 51/00* (2013.01)

(58) Field of Classification Search
CPC .............. B65B 35/405; B65B 2220/18; B65B 2812/16; B65G 19/28; B65G 19/282; B65G 19/30; B65G 51/00; B65G 51/16; B65G 7/06
See application file for complete search history.

(56) References Cited

U.S. PATENT DOCUMENTS

| | | | |
|---|---|---|---|
| 3,269,091 A * | 8/1966 | Martin ................... B65B 5/024 | 53/252 |
| 3,453,800 A | 7/1969 | Mahncke | |
| 3,468,095 A | 9/1969 | Vogt | |
| 3,499,262 A | 3/1970 | Thurston et al. | |
| 3,513,934 A * | 5/1970 | Crowley ................ B60V 3/025 | 104/134 |
| 3,550,508 A | 12/1970 | Wartman, Jr. | |
| 3,557,889 A | 1/1971 | Rejsa | |
| 3,595,374 A * | 7/1971 | Whitfield ................. B23Q 7/08 | 198/367 |
| 3,604,689 A * | 9/1971 | Hutcheson .......... B01F 11/0065 | 366/109 |
| 3,665,675 A | 5/1972 | Johnson | |
| 3,719,289 A | 3/1973 | Buisson et al. | |
| 3,820,467 A * | 6/1974 | Burdick ................. B60V 3/025 | 104/134 |
| 3,821,874 A | 7/1974 | Jones | |
| 3,879,920 A | 4/1975 | Langen | |
| 4,004,349 A * | 1/1977 | Neumann ............... B65G 51/03 | 34/359 |
| 4,211,054 A * | 7/1980 | Sramek ................... B65B 19/34 | 198/706 |
| 4,241,564 A | 12/1980 | Quarenghi | |
| 4,246,740 A | 1/1981 | Chenevard | |
| 4,358,918 A | 11/1982 | Groom et al. | |
| 4,524,564 A | 6/1985 | Groom et al. | |
| 4,537,017 A | 8/1985 | Hengstenberg et al. | |
| 4,567,712 A | 2/1986 | Varallo et al. | |
| 4,578,927 A | 4/1986 | Scarpa et al. | |
| 4,607,479 A | 8/1986 | Linden | |
| 4,703,765 A | 11/1987 | Paules et al. | |
| 4,751,948 A | 6/1988 | Hertig et al. | |
| 4,815,257 A | 3/1989 | Hayes, Jr. | |
| 4,854,111 A | 8/1989 | Roberts et al. | |
| 4,915,547 A * | 4/1990 | Cahill ................. B65G 47/8853 | 193/46 |
| 4,922,688 A * | 5/1990 | Langen ................... B65B 5/061 | 366/218 |
| 4,939,891 A | 7/1990 | Podini | |
| 4,972,494 A * | 11/1990 | White ..................... B65B 19/28 | 209/535 |
| 4,982,556 A | 1/1991 | Tisma | |
| 5,024,042 A | 6/1991 | Meyer | |
| 5,037,245 A * | 8/1991 | Smith ................. B65G 47/5154 | 406/88 |
| 5,072,573 A * | 12/1991 | Tisma .................... B65B 35/205 | 198/803.9 |
| 5,081,816 A | 1/1992 | Cardinali | |
| 5,175,976 A | 1/1993 | Petry et al. | |
| 5,185,984 A | 2/1993 | Tisma | |
| 5,188,217 A * | 2/1993 | Bruno ..................... B65B 35/24 | 198/473.1 |
| 5,203,141 A | 4/1993 | Berciga et al. | |
| 5,209,387 A * | 5/1993 | Long ..................... B65H 20/14 | 226/97.3 |
| 5,212,656 A * | 5/1993 | Clary ..................... G01B 11/04 | 702/84 |
| 5,259,173 A | 11/1993 | Roberts et al. | |
| 5,339,871 A | 8/1994 | Collins et al. | |
| 5,353,847 A | 10/1994 | Cahlander et al. | |
| 5,388,389 A * | 2/1995 | Tisma .................... B65B 35/205 | 53/252 |
| 5,452,568 A * | 9/1995 | Tisma .................... B65B 35/205 | 53/252 |
| 5,465,554 A | 11/1995 | Lewis et al. | |
| 5,495,703 A | 3/1996 | Kruit et al. | |
| 5,501,064 A | 3/1996 | Ingram et al. | |
| 5,570,562 A | 11/1996 | Anderson | |
| 5,657,610 A | 8/1997 | Dietrich et al. | |
| 5,660,022 A | 8/1997 | Lade et al. | |
| 5,727,365 A | 3/1998 | Lashyro et al. | |
| 5,730,277 A | 3/1998 | Meinke et al. | |
| 5,809,751 A | 9/1998 | Braibanti | |
| 5,850,725 A | 12/1998 | Chalendar | |
| 5,951,006 A * | 9/1999 | Biegelsen ............... B65H 23/24 | 271/195 |
| 5,986,230 A | 11/1999 | Novak et al. | |
| 6,032,923 A * | 3/2000 | Biegelsen ............... B65H 5/228 | 137/599.07 |
| 6,135,120 A | 10/2000 | Lofman et al. | |
| 6,305,772 B1 * | 10/2001 | Berkoben ............ B41J 2/16552 | 347/34 |
| 6,622,458 B2 | 9/2003 | Fischer et al. | |
| 6,840,025 B1 | 1/2005 | Chapman | |
| 6,854,244 B2 | 2/2005 | Pike | |
| 6,862,869 B2 | 3/2005 | Lucido et al. | |
| 7,118,963 B2 | 10/2006 | Mori | |
| 7,284,359 B2 | 10/2007 | Haschke | |
| 7,434,376 B2 | 10/2008 | Monti | |
| 7,504,308 B2 | 3/2009 | Kim | |
| 7,513,716 B2 * | 4/2009 | Hayashi ................. B65G 47/22 | 406/87 |
| 7,588,410 B2 * | 9/2009 | Hinsley ................. B65G 51/18 | 198/861.1 |
| 7,631,472 B2 | 12/2009 | Lidington | |
| 7,950,399 B2 | 5/2011 | Winterson et al. | |
| 7,954,498 B2 | 6/2011 | Ott et al. | |
| 7,956,623 B2 | 6/2011 | Bassani et al. | |
| 7,980,251 B2 | 7/2011 | Winterson et al. | |
| 8,015,776 B2 | 9/2011 | Alfonso et al. | |
| 8,092,143 B2 * | 1/2012 | Yang ...................... B65H 5/228 | 271/195 |
| 8,926,308 B2 | 1/2015 | Mihalos et al. | |
| 2003/0131943 A1 * | 7/2003 | Frederisy .......... A61F 13/15617 | 156/538 |
| 2004/0068967 A1 | 4/2004 | Ford et al. | |
| 2004/0088658 A1 | 5/2004 | Minda | |
| 2005/0039419 A1 | 2/2005 | Griggs et al. | |
| 2005/0144912 A1 | 7/2005 | Prakken | |
| 2006/0037876 A1 | 2/2006 | Fath et al. | |
| 2008/0072549 A1 | 3/2008 | Vissers | |

(56) References Cited

U.S. PATENT DOCUMENTS

| | | | |
|---|---|---|---|
| 2008/0104932 A1 | 5/2008 | Heilman et al. | |
| 2010/0064632 A1 | 3/2010 | Griggs et al. | |
| 2010/0071711 A1 | 3/2010 | Boldrini | |
| 2010/0199601 A1 | 8/2010 | Boldrini | |
| 2010/0252056 A1 | 10/2010 | Gruss | |
| 2010/0307112 A1 | 12/2010 | Andersen | |
| 2010/0326016 A1* | 12/2010 | Smith | B65B 1/02 53/449 |
| 2012/0060446 A1 | 3/2012 | Merz | |
| 2012/0291401 A1 | 11/2012 | Mitten et al. | |
| 2015/0164140 A1 | 6/2015 | Williams | |
| 2015/0374556 A1* | 12/2015 | Kawka | A61F 13/15764 406/12 |
| 2016/0101947 A1* | 4/2016 | Himmelmann | B65G 51/03 406/88 |

FOREIGN PATENT DOCUMENTS

| | | |
|---|---|---|
| JP | H08504719 A | 5/1996 |
| JP | 2003-031677 A | 1/2003 |
| JP | 2004-152929 A | 5/2004 |
| JP | 2004-266067 A | 9/2004 |
| JP | 2004-342922 | 12/2004 |
| JP | 2008-538911 A | 11/2008 |
| WO | WO-94/23997 A1 | 10/1994 |
| WO | WO-2006/120570 A2 | 11/2006 |

OTHER PUBLICATIONS

International Preliminary Report on Patentability dated May 15, 2014 for PCT/US2012/063032.
Official Action dated Feb. 4, 2015 for Chinese Appln. No. CN 201280065645.2.
Communication and Supplementary European Search Report dated Feb. 19, 2015 for European Appln. No. 12844944.4 (7 pages).
Office Action dated Jun. 23, 2017 in corresponding Japanese Patent Application No. 2014-540074, with translation (16 pages).
Office Action dated Apr. 24, 2018 in corresponding Mexican Patent Application No. MX/a/2014/005334 (with summary page), 6 pages.
Chinese Office Action dated Oct. 14, 2015 in related Chinese Application No. 201280065645.2.
Chinese Office Action dated Apr. 19, 2016 in related Chinese Application No. 201280065645.2.
Chinese Office Action dated Oct. 20, 2016 in related Chinese Application No. 201280065645.2.
Indian Office Action dated Mar. 13, 2019 in related Indian Application No. 3941/CHENP/2014.
Japanese Office Action dated Sep. 6, 2016 in related Japanese Application No. 2014-540074.
Russian Office Action dated Aug. 9, 2016 in related Russian Application No. 2014122169.

* cited by examiner

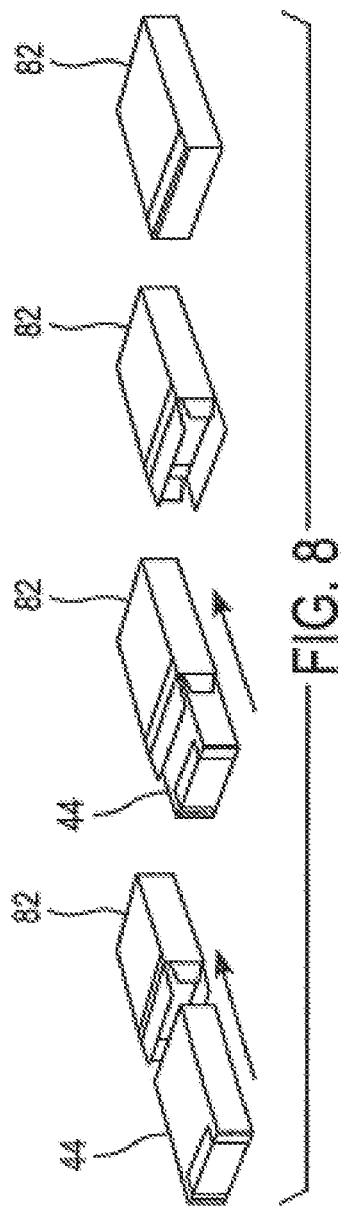

ial application of U.S.
APPARATUS AND METHOD OF PACKAGING LOOSE PRODUCT

CROSS REFERENCE TO RELATED APPLICATION

This application is a continuation application of U.S. patent application Ser. No. 13/666,485, filed Nov. 1, 2012, which claims priority under 35 U.S.C. § 119(e) to U.S. Provisional Application No. 61/554,303, filed on Nov. 1, 2011, the entire contents of which are incorporated herein by reference.

WORKING ENVIRONMENT AND PROBLEM ADDRESSED

Smokeless tobacco products can be packaged and sold in round metal, plastic or paperboard cans which have removable metal or plastic lids. A new development is to package smokeless tobacco products, including pouched MST (snus) in hinge-lid boxes.

Machine handling of snus during packaging presents difficulties, because of its tackiness and pillow shape. Boxing operations may include placement of a desired portion (or lot or quantity) into a bag and then placing the bag into a box or other container.

The use of bags requires establishment of "head room" in the bag so that product is not caught in sealing of the bag at its top. The presence of head room in the box creates an impression upon opening of the box being only partially filled and frustrates easy removal of the first several pieces. The latter is particularly true for small boxes such as those which are to be used with snus.

It is desirable to achieve packaging methods and articles which avoid a need for head room and its disadvantages.

SUMMARY

In a preferred embodiment, an apparatus for high speed packaging of loose product is provided. The apparatus comprises a loading station, a box forming station, and an unloading station. The loading station includes chutes in spaced apart relation. Each chute has an open top, an open upstream end, and an open downstream end. The open top is configured to receive loose product while moving along a first feed path.

The box erecting apparatus is operable to erect boxes in spaced apart relation with first and second open sides and align the first open side of each box with the open downstream end of a corresponding chute while traveling along a second feed path, which is parallel to the first feed path.

The unloading station includes a stationary vacuum head in communication with the second open side of each box. The vacuum head provides a continuous vacuum source along the second feed path. Preferably, the unloading station also includes a plunger in communication with the open upstream end of the chute. Loose product is transferred from the chute through the open downstream end and to the box at the unloading station.

In the preferred embodiment, the apparatus can also include a lid operable to cover the open top of each chute when positioned at the box erecting apparatus. Also preferably, the lid includes at least one air inlet operable to deliver air from a pressurized air source to each chute so as to agitate any remaining loose product contained in the chute and urge the loose product from the chute.

Preferably, an inner surface of the chute includes a non-stick coating. The vacuum head includes a screen having openings sized to substantially prevent suction of loose products into the vacuum head. Preferably, the plunger moves reciprocally from a first upstream position to a second downstream position when aligned with the open upstream end of the chute. Also preferably, the loading station includes cups operable to dump loose product into the open top of the chute.

In the preferred embodiment, the box erecting apparatus further includes a conveyor for moving boxes along the second feed path. Preferably, the box erecting apparatus also includes a support bar operable to hold erected boxes open while traveling along the second feed path.

In another preferred embodiment, a method of loading boxes with loose products is provided. The method includes loading loose products into chutes in spaced apart relation. Each chute has an open top, an open upstream end, and an open downstream end. The open top is operable to receive loose product while moving along a first feed path. The method also includes aligning boxes in spaced apart relation, each box having a first and second open side, and aligning the first open side of each box with the open downstream end of a corresponding chute while moving the boxes along a second feed path. The second feed path is parallel to the first feed path. The method can also include unloading loose product from each chute into a corresponding box by communicating vacuum through the second open side of each box so as to pull loose product from the chute and into the box.

Preferably, the method can also include advancing a plunger through the upstream end of the chute, through the downstream end of the chute, and into the corresponding box thereby assuring a complete transfer of loose product to the box. In the preferred embodiment, the method can include covering the open top of each chute with a lid prior to applying suction and providing at least one air inlet in the lid operable to deliver air from a pressurized air source to each chute. Also preferably, the plunger is plunged about 2 mm to about 4 mm into the erected box.

BRIEF DESCRIPTION OF THE DRAWINGS

FIG. 8 is an illustration of further packaging steps that can be performed at the further packaging station of FIG. 1.

DETAILED DESCRIPTION

Figure 1:
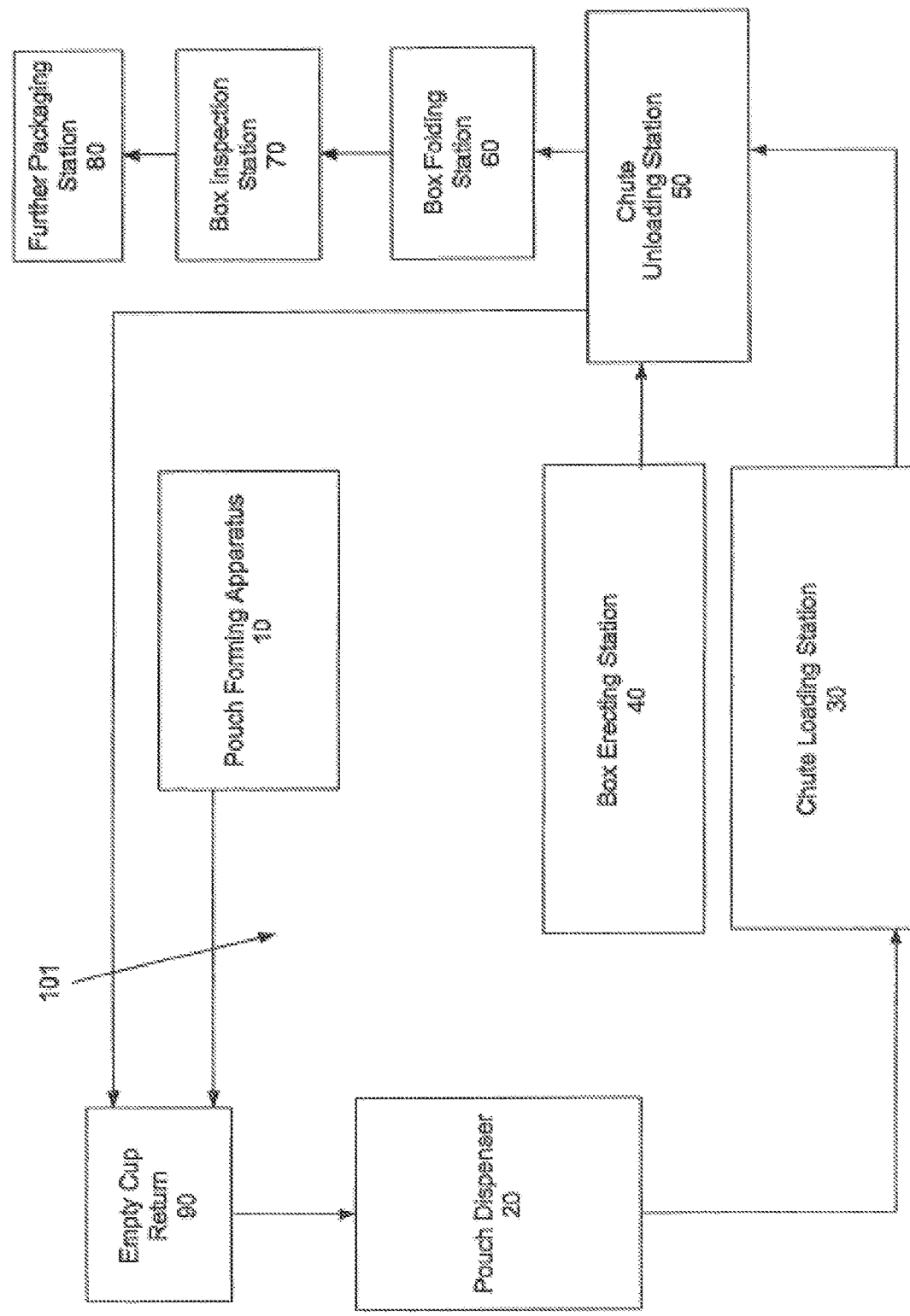
FIG. 1 is a flow diagram of an apparatus and method for loading pouch products in boxes.

In the preferred embodiment, as shown in FIG. 1, a snus forming and packaging system 101 is provided which preferably comprises a chute (or bucket) loading station 30, a box erecting station 40 and a chute unloading station 50. Preferably, loose product 122 (shown in FIG. 2) is loaded into chutes at the chute loading station 30, boxes are at least partially erected at the box erecting station 40, and the loose product 122 is transferred from each chute into a corresponding box at the chute unloading station 50.

In the preferred embodiment, the loose product 122 comprises oral tobacco or non-tobacco pouch products such as those described in commonly-owned U.S. Pat. No. 7,980, 251 issued Jul. 19, 2011 and U.S. Pat. No. 7,950,399 issued May 31, 2011, the entire content of each of which is incorporated herein by this reference thereto.

Preferably, the pouch products are formed at a pouch forming apparatus 10, which can be a high speed vertical form, fill and seal apparatus or other suitable pouch forming apparatus. In the preferred embodiment, the pouch forming apparatus such as a vertical filling machine obtainable from Merz Verpackungmachinen GmbH of Germany. Other suitable machines may be sourced from Ropak Manufacturing Company of Alabama, USA, among others.

Figure 7A:
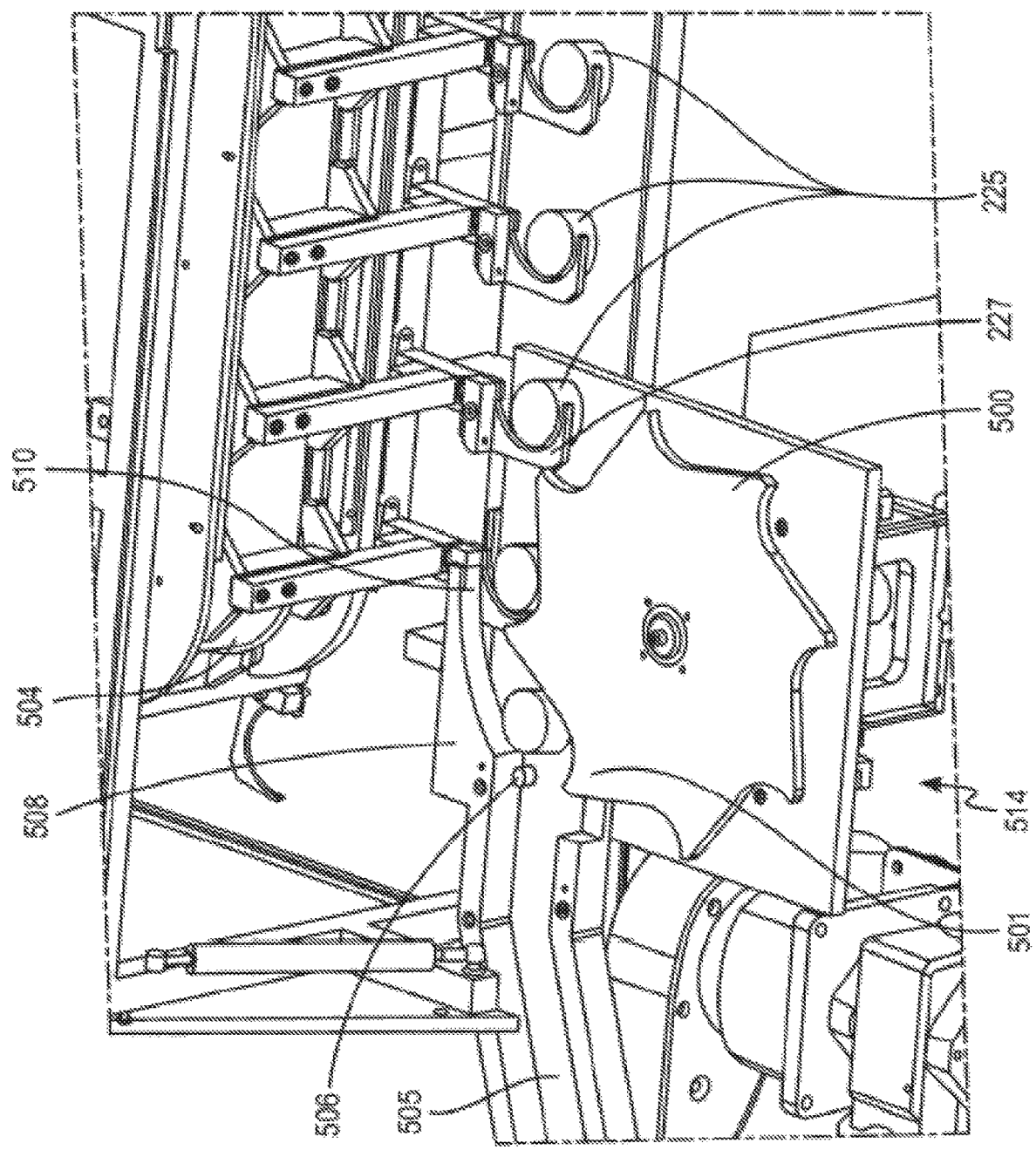
FIGS. 7A and 7B are illustrations of the chute loading station utilizing a cup transport system as described herein.
Figure 7B:
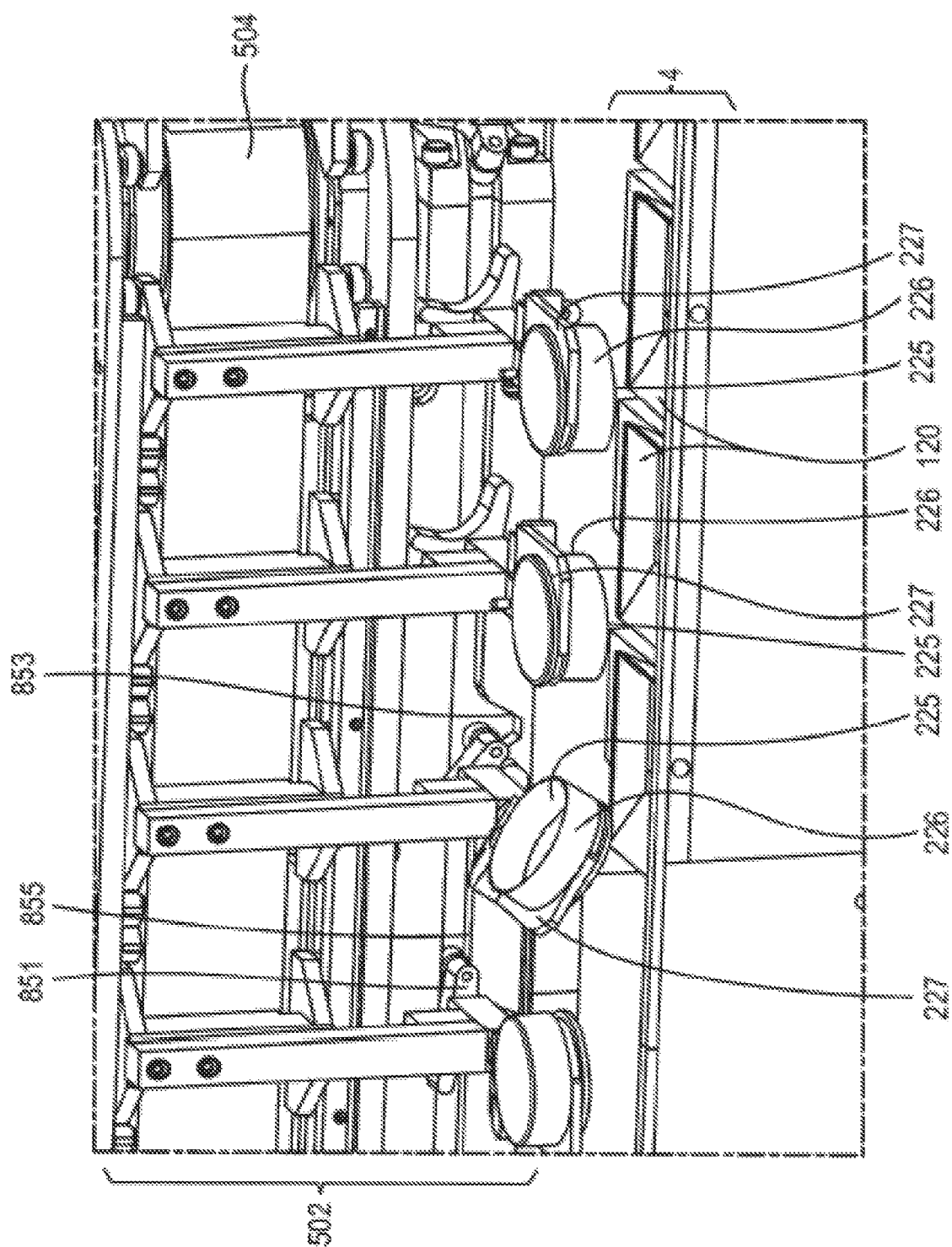
Figure 10:
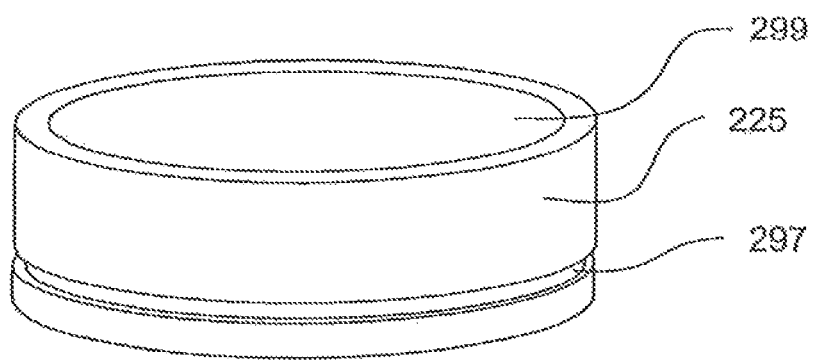
FIG. 10 is a perspective view of an individual cup of the preferred embodiment.

After formation, the pouch products are moved to a pouch dispenser 20, which dispenses a predetermined quantity of pouch products into individual cups 225 (shown in FIGS. 7A, 7B and 10). Preferably, the predetermined quantity is chosen to coincide with the number of pouch products to be placed in an individual consumer package. In the preferred embodiment, the pouch dispenser 20 comprises the dispenser provided on the Merz machine.

Referring now to FIG. 10, the cup 225 preferably comprises a cupped body constructed of a hard plastic of proportions akin to those of a bottom portion of a commercially available snus can (such as in the packaging of loose moist snus tobacco). Such configuration of the cup 225 promotes compatibility of the cup 225 with snus loading and canning machines and associated conveyors. In the preferred embodiment, each cup 225 is provided with an annular recess 297, preferably adjacent its base, although other locations might be practiced. Each cup 225 is opened at its top 299 and provides sufficient volume to receive a predetermined, desired count (or lot) of snus product.

In the preferred embodiment, the cups 225 move to the chute loading station 30 via a cup transport system. A suitable cup transport system is a hook type system shown in FIGS. 7A and 7B. As shown in FIG. 7A, cups 225 loaded with loose product are transported to the cup transport system where a star wheel 500 pushes each cup 225 into position for pickup by a hook 227. Each cup 225 can be picked up around a periphery 226 thereof by the hook 227 and carried along a third feed path 502 which is parallel to and directly above a first feed path 4 on which the chutes 120 travel as shown in FIG. 7B. Preferably the hooks 227 are sized to releasably engage each cup 225 at its recess 297. Preferably, multiple hooks 227 are attached to a conveyor 504 that travels horizontally in a continuous loop in a path resembling a racetrack. However, other suitable arrangements are possible.

The star wheel 500 preferably moves continuously and includes a plurality of claws 501, each of which engages a trailing side of a cup 225 as the latter is released from the inclined chute 505 by retraction of a pin 506, whose retraction is synchronized with the rotation of the wheel 500. A rail (guide) 508 guides each cup 225 into an intersecting relation with an arriving hook 227. The end portion 510 of the rail 508 is spaced from working surfaces of the wheel 500 such that the respective cup 225 is momentarily held in slight compression so that the arriving hook 227 engages and clasps the cup 225 about its recess 297 (FIG. 10). A biased detent at the base of the hook 227 assures a releasable retention of the cup 225 on the hook 227.

Preferably, the hooks 227 flip the cups 225 sequentially, one at a time, as each cup 225 is positioned above a chute 120 to dump loose product 122 into an open top 124 of the chute 120 positioned beneath and continuously moving with the cup 225. The empty cups are returned to the pouch dispenser 20 and filled again. Alternatively, the pouch products can be moved to the chute loading station 30 by other methods and arrangements. For example, a predetermined quantity of pouch products can be placed directly from the pouch forming apparatus 10 directly into the chute 120 at the chute loading station 30. Arrangements with trap doors and other expedients are also envisioned.

At the chute loading station 30, a plurality of a chutes 120 move horizontally along a continuous loop such that each chute 120 is repeatedly loaded with loose product at the chute loading station 30 and unloaded at the unloading station 50. In the preferred embodiment, the chutes 120 travel in spaced apart relation along the first feed path 4 and are releasably attached to a conveyor that travels horizontally along a rectilinear path at the chute loading station 30 and the chute unloading station 50. Once the chutes 120 are unloaded at the unloading station 50, the conveyor turns downwardly so as to return the chutes 120 to the chute loading station 30.

Preferably, each chute 120 (shown in FIGS. 2 and 3) is loaded with the loose product from a single cup 225 (shown in FIG. 7). The chute 120 then moves along the first feed path 4 to the chute unloading station 50 where the loose product is transferred from the chute 120 into a corresponding box 44.

Figure 3:
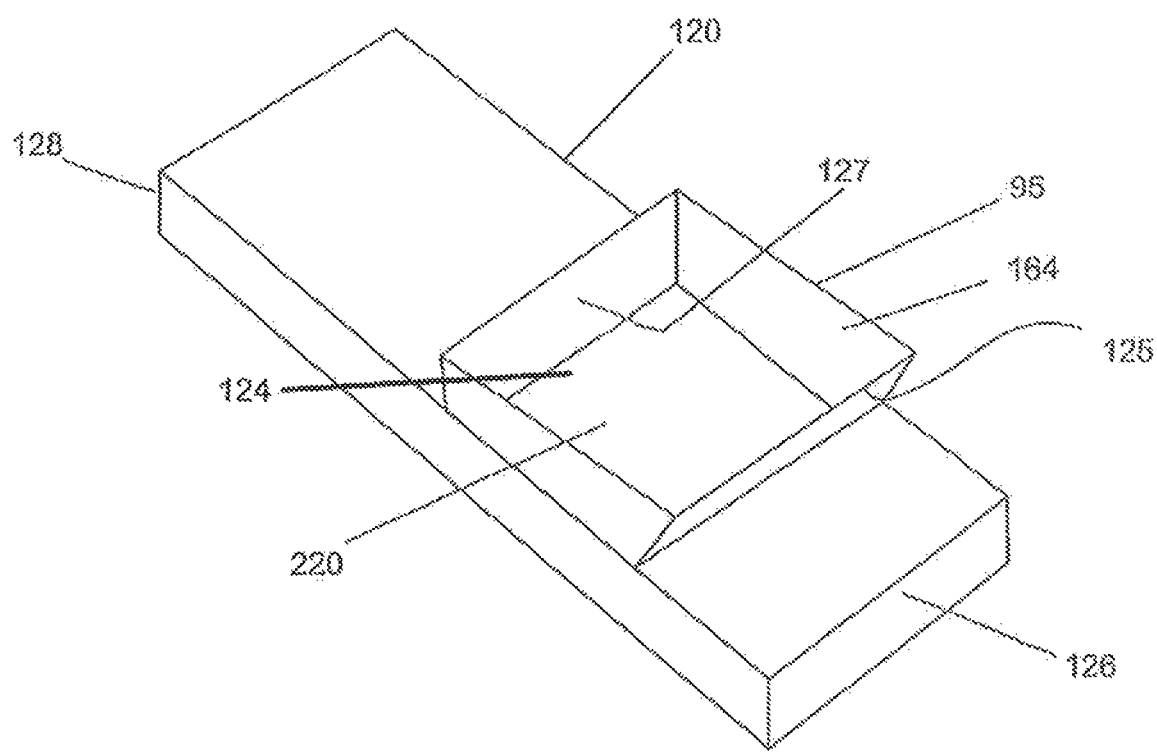
FIG. 3 is perspective view of a chute for use with the apparatus of FIG. 2.

As shown in FIG. 3, each chute 120 has an open top 124, an open upstream end 126, and an open downstream end 128. The open top 124 is sized and configured to allow for placement of loose product 122 into the chute 120 at high speed as the chute moves along the first feed path 4 and the cup 225 moves along the third feed path 502. Moreover, the open top 124 can include substantially vertical sidewalls 164 extending around the periphery of the open top 124 and inclined end walls 125, 127. The sidewalls 164 can be formed at an angle so as to form a funnel through which the loose product 122 travels as it enters the chute 120. Moreover, the sidewalls 164 can be preferably about 0.5 inch to about 3.0 inches in height.

Preferably, the inner surface 220 of each chute 120 includes a non-stick coating so as to substantially prevent loose product from sticking to the inner surface 220 of the chute 120. Preferably, each chute 120 is releasably attached to its conveyor to facilitate removal for cleaning.

As noted above, loose product 122 is released into the open top 124 from a corresponding cup 225 as the cup 225 travels in a superposed relation to a respective chute 120. In the preferred embodiment, each cup 225 and a respective chute 120 are superposed and travel at the same speed. Thus, the cups 225 travel along a linear path (the third feed path 502), which is parallel to the first feed path 4 along which the chutes 120 travel. The apparatus is arranged such that each cup 225 is flipped over to release product while a chute 120 is aligned beneath the cup 225.

Referring now to FIG. 7B, each hook 227 preferably is subject to the action of a cam follower 851; which when progressed into a recess 853 of the guide 855, causes the hook 227 to flip. The cup 225 then continues along in an upside down relation with the hook 227 now leading the cup 225. This relationship is maintained until the cup 225 is plowed off the hook 227 by a rail or other suitable contrivance onto a conveyor, which returns the cups 225 to the pouch dispenser 20 in an upside down condition. Return conveyance in an upside-down condition avoids collection of dust or dirt and assures emptiness for the next loading cycle. The pouch dispenser 20 includes a rail to flip each cup 225 into right-side up orientation prior to reloading of the cup 225.

At or about the same time as the chute 120 is loaded with loose product 122, a box 44 (shown in FIG. 2) is at least partially erected at a box erecting station 40. In the preferred embodiment, each box 44 is a side-loading, inner box such as that described in commonly-owned Non-Provisional patent application Ser. No. 13/325,803 filed Dec. 14, 2011, the entire content of which is incorporated herein by reference thereto. Alternatively, the box 44 can be loaded via a top or bottom openings or the box 44 can be an outer box.

In the preferred embodiment, the box blank is in a flattened condition, with top and front panels superimposed over and connected with bottom and back panels, and with dust flaps 159 and side flaps 160 disposed within the general plane of the flattened blank.

Figure 2:
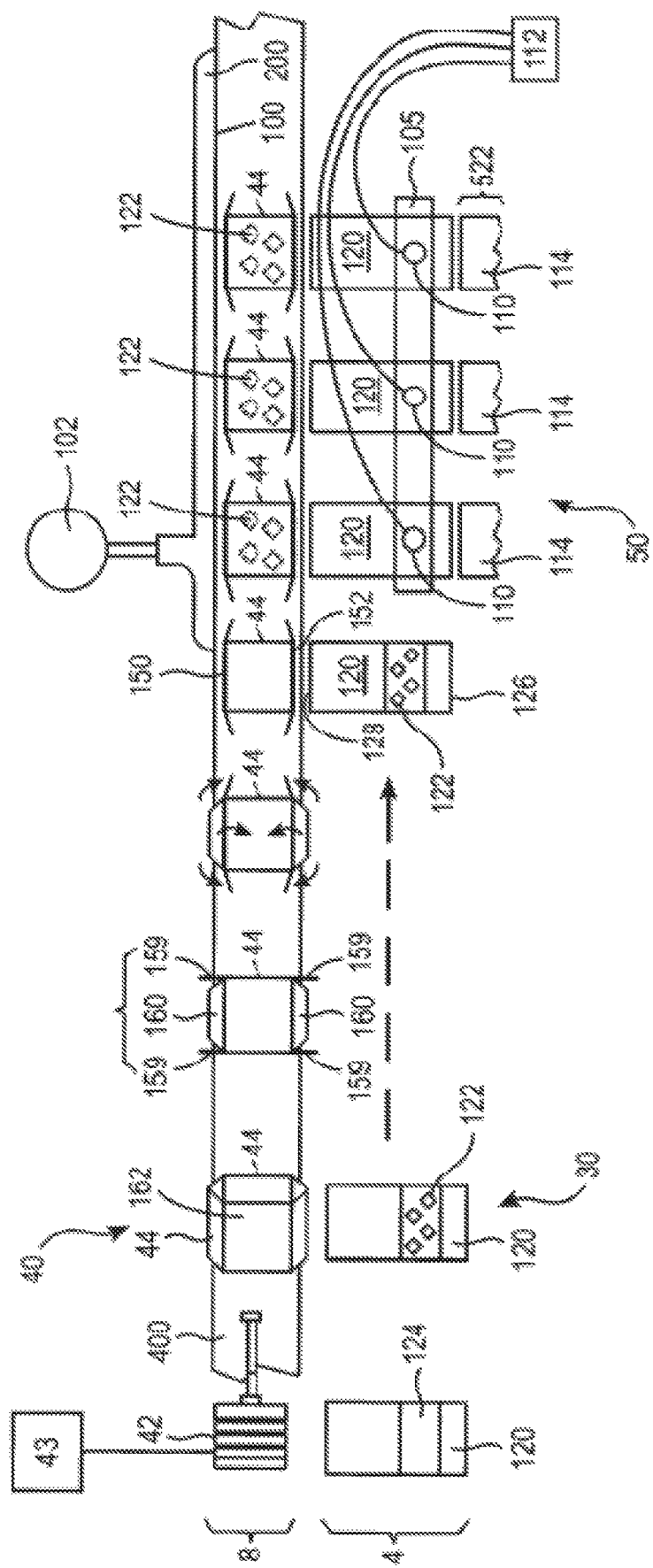
FIG. 2 is a top view of an apparatus for loading pouch products in boxes.
Figure 6:
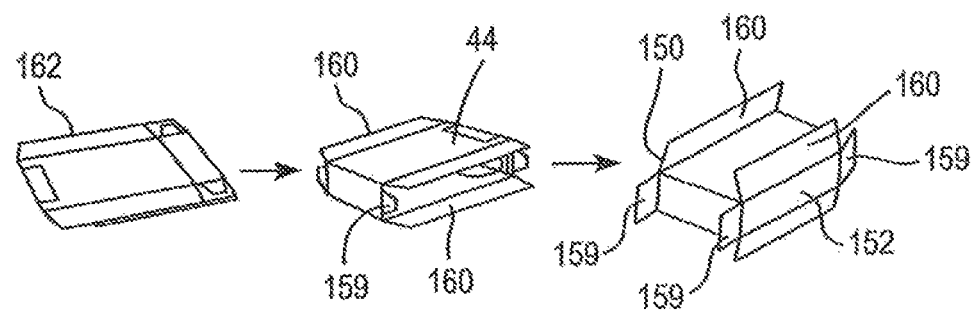
FIG. 6 is an illustration showing a box blank being partially erected at a box erecting station as described herein.

Preferably, a rotary blank feed 42 feeds box blanks from a hopper 43. Each blank 162, as shown in FIGS. 2 and 6, is erected to form a box 44 along a second feed path 8, which is substantially parallel to the first feed path 4. Once the box 44 is erected, plows and tuckers open the dust flaps 159 and the side flaps 160 outwardly to expose a first open side 150 and a second open side 152. The erected box 44 then moves along the second feed path 8 to the chute unloading station 50.

In the preferred embodiment, the box erecting station 40 further includes a conveyor 400 (shown in FIG. 2) for moving boxes 44 along the second feed path 8. Preferably, the box erecting apparatus also includes a support bar 560 (shown in FIG. 9) which is operable to hold erected boxes 44 open while traveling along the second feed path 8.

Preferably, the second feed path 8 travels substantially parallel to and at the same speed as the first feed path 4 so that each box 44 has a corresponding chute 120 with which to mate at the chute unloading station 50. Thus, at the chute unloading station 50, the second open side 152 of the box 44 is aligned with a downstream end 128 of the chute 120 and the first open side 150 of the box is in contact or proximate with a face 100 of a vacuum head 200 which receives vacuum from vacuum source 102.

Figure 9:
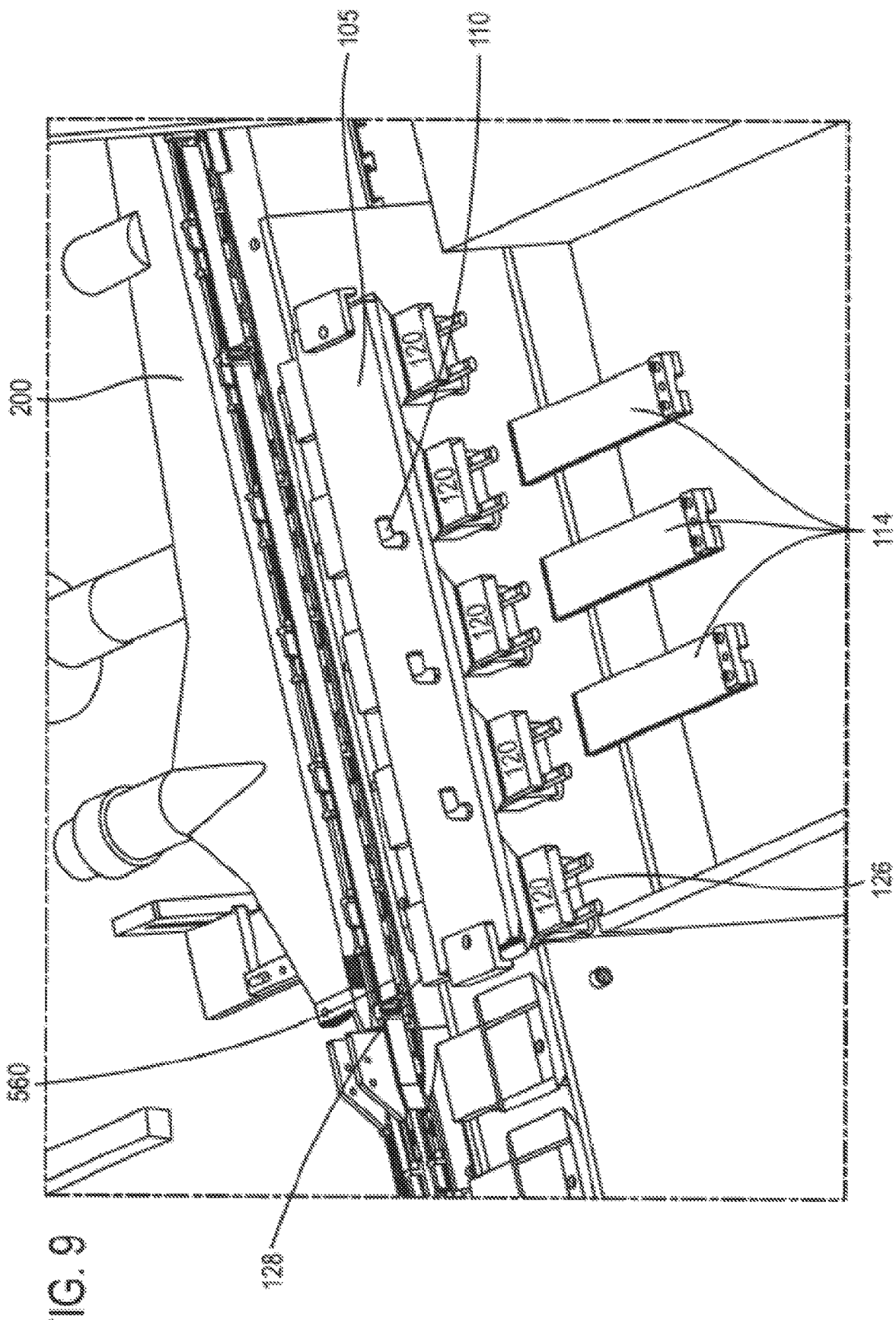
FIG. 9 is an illustration of the unloading station of FIG. 1.

Referring now to FIGS. 2 and 9, once the chutes 120 reach the chute unloading station 50, the chutes 120 travel under a stationary lid 105, which may contact upper edges 95 of the open top 124 and/or sidewalls 164 of the chute 120. Typically, the lid 105 does not form a seal, but does substantially close off the open top 124 of the chute 120. Preferably, the lid 105 includes multiple spaced apart air inlets 110, each of which lines up with the open top 124 of a chute 120 as it passes underneath the lid 105. Preferably, the air inlets 110 are connected to a pressurized air source 112, which provides a pulse of air to the chute 120. Preferably, the pulse of air is timed with alignment of the chute 120 underneath the air inlet 110. The pulse of air agitates the loose product 122 disposed within the chute 120 as vacuum is applied so as to ensure that the entire predetermined quantity of loose product 122 is transferred from the chute 120 into the confines of the opened box 44. The agitation also assures that product does not form a blocking mass of product or "bridges" the chute 120. Agitation can be achieved instead by or supplemented with mechanical arrangements (e.g., vibratory plates or pins) or electromechanical arrangements such as with ultrasonic devices. The pulses of air of the preferred embodiment are preferably at or about approximately 2 or 3 psi, when packaging snus.

Also preferably, the unloading station 50 includes a stationary vacuum head 200 in communication with the second open side 150 of each box 44. The vacuum head 200 in the preferred embodiment is about 1 foot to about 4 feet in length when packaging pouched snus and each box 44 travels along the length of the vacuum head 200 while suction is applied.

In the preferred embodiment, a source of vacuum 102 comprises a vacuum pump connected to the vacuum head (plenum) 200 to provide a continuous vacuum source along the second feed path 8. When packaging pouched snus, the vacuum pump preferably is capable of drawing air at a rate in the range of approximately 300 to 500 cubic feet per minute. In practice, a vacuum pump of 10 horsepower with a rating of 420 cfm and capability to draw vacuum of 100 inches of water should suffice for snus product. Such arrangement provides sufficient vacuum to the product through the vacuum head 200 at the second open side 150 of each box 44 so as to pull loose product 122 from the chute 120 into the interior of each box 44, essentially without compressing the product.

Figure 5:
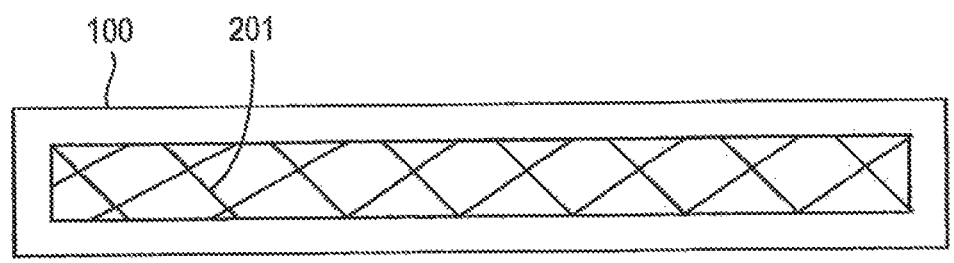
FIG. 5 is a front view of the vacuum head for use in the apparatus of FIG. 2.

In the preferred embodiment, as shown in FIG. 5, the vacuum head (plenum) 200 has a face 100 which includes a screen 201 having openings sized to substantially prevent suction of loose product 122 into the vacuum head 200 as vacuum is applied.

Preferably, the vacuum plenum 200 is located downstream of where loose product 122 is released from a cup 225 into a chute 120. Preferably, agitation of product occurs as vacuum begins to be communicated through the chute 120 to the product 122.

In the preferred embodiment, about three chutes 120 are unloaded at a time. However, more or fewer chutes 120 could be unloaded at a time depending upon the length of the vacuum head 200 and the spacing between the chutes 120.

Figure 4:
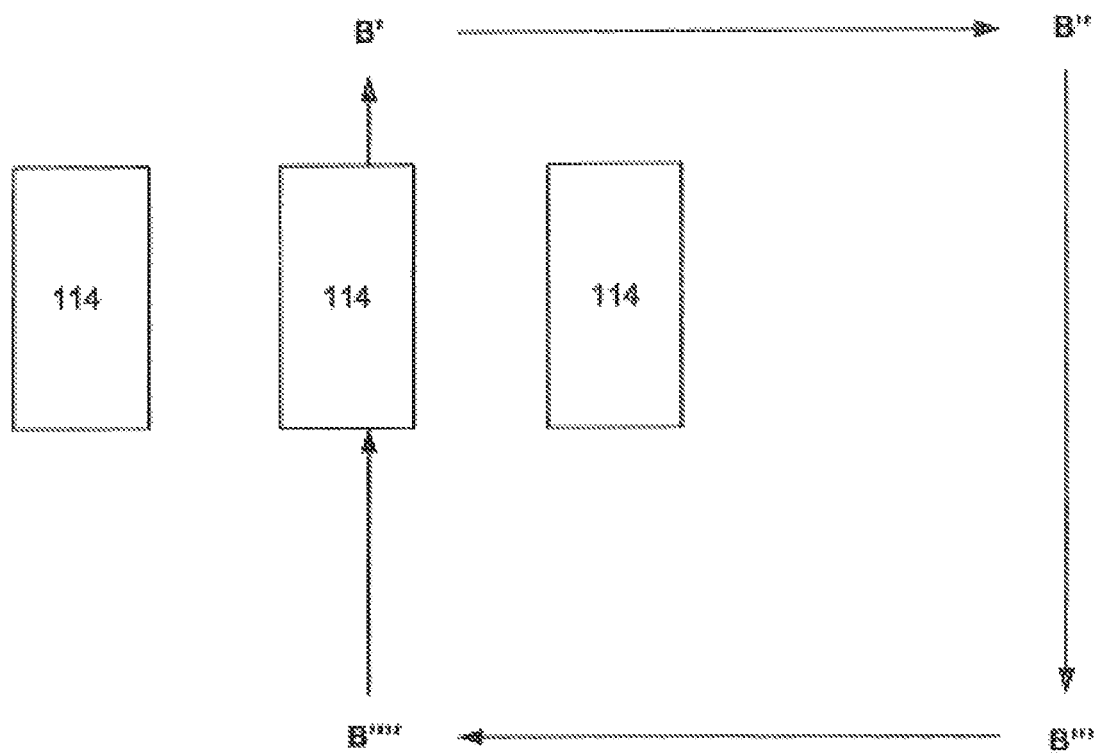
FIG. 4 is a top view illustrating the path of the plungers shown in FIG. 2.

Also in the preferred embodiment, as shown in FIG. 2, the open upstream end 126 of the chute 120 is sized to accept a plunger 114 therethrough. Preferably, the apparatus includes a plurality of plungers 114, which travel along a fourth feed path 522. In the preferred embodiment there are three plungers. The plungers 114 are reciprocal and move forward to position B' (shown in FIG. 4) after suction has been applied and the loose product 122 has substantially been moved from the chute 120 and into the box. 44. Each plunger 114 moves forward and through each corresponding chute 120 such that the plunger 114 enters the corresponding box 44 only slightly, preferably only about 2 mm to about 4 mm. The plungers do not travel further into the box 44 to avoid compression of the loose product 122. After moving into the box 44, the plunger 114 then moves with the chute 120 to position B" before moving out of the chute 120 to position B'" and finally back to initial position B"" where the plunger 114 waits for the next corresponding chute 120. The three plungers of the preferred embodiment move with the chutes to which they correspond and move together to return to position B". Action of the plungers assures clearance of product from the chutes 120 and complete delivery into the interior spaces of the opened boxes.

Once the box 44 is filled with loose product 122, the box dust and side and flaps 159, 160 are optionally glued and folded at the box folding station 60 to close and optionally seal the box 44. The box 44 is then inspected at the box inspection station 70 to check for holes, improper seals, and the like.

As shown in FIG. 8, the box 44 can then travel to the further packaging station 80, where the box 44, can be placed in an outer box 82. In addition, overwrap can be applied to the outer box 82 to maintain freshness of the loose product 122. The overwrap can be formed of any suitable plastic or foil material. Meanwhile, the cups 225 used to deliver loose product 122 to the chutes 120 are returned via empty cup return 90 to the pouch dispenser 20.

By such arrangement as described above, snus and other loose product may be loaded into a box or other container with a more complete, uniform, homogeneous and efficient disposition of the loose product within the container. Undesirable and troublesome headspace is avoided. Smaller containers can be used for the same amount of product, which may lead to significant savings in packaging materials and space requirements in displaying product at retail. The arrangement provides high speed production capability, particularly with boxing of pouched snus product.

In another preferred embodiment, a method of filling or loading boxes with loose product(s) is provided. Broadly speaking, the method includes establishing a procession of package structures, each of which has first and second openings and an interior space or volume. Establishing the procession of package structures may also include folding open flaps of a package. In addition, the method includes repetitively establishing predetermined quantities of loose product and repetitively disposing said quantities at locations adjacent said first openings. That repetitive disposition of quantities may include loading loose products into chutes in spaced apart relation. Each chute has an open top, an open upstream end, and an open downstream end. The open top is operable to receive loose product while moving along a first feed path. The method also includes aligning boxes in spaced apart relation, each box having a first and second open side, and aligning the first open side of each box with the open downstream end of a corresponding chute while moving the boxes along a second feed path. Preferably, the second feed path is parallel to the first feed path.

Also preferably, the method includes transferring or unloading disposed quantities of loose product from each chute into the interior space of a corresponding box by applying or communicating a vacuum through the second open side of each box so as to pull loose product from the chute and into the box. The transferring step may further include moving the open package along a vacuum plenum.

Preferably, the step of transferring of loose product by communicating a vacuum includes agitating the loose product while applying vacuum. In the preferred embodiment, the method can include covering the open top of each chute with a lid as or prior to applying vacuum and providing at least one air inlet in the lid operable to deliver air from a pressurized air source to each chute to agitate product as vacuum is applied.

Preferably, the method can also include purging the chute or passage or errant product by advancing a plunger through the upstream end of the chute, through the downstream end of the chute, and into the corresponding box thereby assuring complete transfer of loose product to the box. Preferably the plunger is advanced into the interior of the box slightly, such that mechanical compression of product is avoided or minimized. Also preferably, the plunger is plunged only about 2 mm to about 4 mm into the erected box.

When the product has been loaded into the box, the method also includes closing the first and second openings of the box.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail an apparatus and method for packaging loose product with reference to a specific embodiment thereof, it will be apparent to one skilled in the art that various changes and modifications and equivalents to the apparatus and method may be employed, which do not materially depart from the spirit and scope of the invention.

We claim:

1. A system, comprising:
a first conveyor configured to move chutes in a spaced apart manner along a first feed path;
a chute unloading station including,
a pressurized air source, and
a stationary lid, the stationary lid being configured to substantially close off a first opening on an upper portion of each of the respective chutes as the chutes move underneath the stationary lid, the stationary lid including air inlets that are spaced apart along the stationary lid, the air inlets being connected to the pressurized air source and being configured to provide a pulse of air through the first opening of each of the respective chutes to agitate at least one pouch of product; and
a second conveyor configured to move erect boxes along a second feed path to the chute unloading station, the second feed path being substantially parallel to the first feed path at the chute unloading station,
wherein each chute is configured to be loaded with at least one pouch of product at a chute loading station as the chutes move along the first feed path, the at least one pouch of product being transferred from the chutes into an interior space of each of the erect boxes at the chute unloading station as the chutes move along the first feed path and the erect boxes move along the second feed path.

2. The system of claim 1, further comprising:
the chute loading station; and
a cup transport system configured to transport cups loaded with the at least one pouch of product along a third feed path to the chute loading station, the third feed path being substantially parallel to and above the first feed path at the chute loading station,
wherein the chute loading station is configured to dump the at least one pouch of product from each of the respective cups into the first opening of the chutes, as the chutes are aligned beneath the cups.

3. The system of claim 2, wherein the cup transport system includes:
hooks that pick up and move the respective cups loaded with the at least one pouch of product.

4. The system of claim 3, wherein each hook is subject to an action of a cam follower that is configured to progress into a recess of a guide of the chute loading station to cause the hook to flip each cup carried by the respective hook.

5. The system of claim 2, further comprising:
a pouch product dispenser configured to load the cups of the cup transport system with the at least one pouch of product, wherein the at least one pouch of product is a moist snus tobacco pouch.

6. The system of claim 1, wherein the chute unloading station further includes:
a vacuum head configured to communicate a vacuum through a first open side of the erect boxes and pull the at least one pouch of product through a second open side of each of the respective erect boxes as the chutes move along the first feed path and the erect boxes move along the second feed path.

7. The system of claim 1, further comprising:
a box inspection station configured to inspect the erect boxes for holes or improper seals after the at least one pouch of product is transferred into the interior spaces thereof and the erect boxes are closed.

8. The system of claim 1, wherein
the chute unloading station further includes:
plungers configured to move along a fourth feed path, the plungers being configured to align and pass through with a second opening of the respective chutes, travel through an inner cavity and a third opening of the respective chutes, and advance into a first open side and the interior space of the respective erect boxes, prior to withdrawing from the respective chutes as the chutes move along the first feed path and the plungers move along the fourth feed path.

9. The system of claim 1, wherein
the chute unloading station further includes:
a mechanical arrangement or an electro-mechanical arrangement configured to agitate the at least one pouch of product in the respective chutes.

10. The system of claim 1, further comprising:
a box erecting station configured to erect box blanks moving to the chute unloading station in order to form the erect boxes.

11. The system of claim 1, further comprising:
the chutes, each chute including walls defining,
an inner cavity in communication with the first opening, a second opening and a third opening,
the second opening and the third opening being on opposing ends of the respective chute.

12. The system of claim 11, wherein the walls of each of the chutes include,
a first opposing pair of walls forming a first side wall and a second side wall of the respective chute, and
a second opposing pair of walls forming a top wall and a bottom wall of the respective chute.

13. The system of claim 12, wherein the top wall at least partially defines the first opening.

14. The system of claim 12, wherein the first side wall, the second side wall, the top wall and the bottom wall collectively define both the second opening and the third opening.

15. The system of claim 11, wherein the first opening is at least partially defined by at least one substantially vertical wall extending from the upper portion of each of the respective chutes.

16. The system of claim 15, wherein the first opening is further, at least partially defined by, at least one pair of inclined end walls that extend from the upper portion of each of the respective chutes, the at least one pair of inclined end walls being inclined away from each other to increase a size of the first opening on the upper portion of each of the respective chutes.

* * * * *